(12) United States Patent
Liu et al.

(10) Patent No.: US 12,007,805 B2
(45) Date of Patent: Jun. 11, 2024

(54) FOLDABLE DISPLAY PANEL AND MANUFACTURING METHOD OF FOLDABLE DISPLAY PANEL

(71) Applicant: Shenzhen China Star Optoelectronics Semiconductor Display Technology Co., Ltd., Guangdong (CN)

(72) Inventors: Kang Liu, Guangdong (CN); Baixiang Han, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 222 days.

(21) Appl. No.: 17/637,089

(22) PCT Filed: Jan. 11, 2022

(86) PCT No.: PCT/CN2022/071179
§ 371 (c)(1),
(2) Date: Feb. 22, 2022

(87) PCT Pub. No.: WO2023/123549
PCT Pub. Date: Jul. 6, 2023

(65) Prior Publication Data
US 2023/0221757 A1   Jul. 13, 2023

(30) Foreign Application Priority Data
Dec. 28, 2021 (CN) .......................... 202111622431.8

(51) Int. Cl.
*G06F 1/16* (2006.01)
(52) U.S. Cl.
CPC .................................. *G06F 1/1616* (2013.01)
(58) Field of Classification Search
None
See application file for complete search history.

(56) References Cited

U.S. PATENT DOCUMENTS

| 10,020,462 B1 * | 7/2018 | Ai ........................ H10K 50/841 |
| 11,453,193 B2 * | 9/2022 | Cosgrove ................ G09F 9/301 |
| 2015/0049428 A1 * | 2/2015 | Lee ........................ G06F 1/1652 |
| | | 361/679.27 |

(Continued)

FOREIGN PATENT DOCUMENTS

| CN | 107195253 A | 9/2017 |
| CN | 109036135 A | 12/2018 |

(Continued)

*Primary Examiner* — James Wu
*Assistant Examiner* — Christopher L Augustin
(74) *Attorney, Agent, or Firm* — Rivka Friedman

(57) ABSTRACT

A foldable display panel and a manufacturing method of the display panel are provided. A plurality of photo spacers are disposed in a first region of the foldable display panel, i.e., the plurality of photo spacers are disposed at a folded position. Widths of the photo spacers gradually decrease from a flexible substrate to a direction away from the flexible substrate. When the foldable display panel is folded, the photo spacers can cooperate with a folding curve to contact with each other, thereby reducing extrusion between the plurality of photo spacers.

18 Claims, 4 Drawing Sheets

(56) References Cited

U.S. PATENT DOCUMENTS

2018/0102399 A1    4/2018   Cho et al.
2018/0321708 A1*   11/2018   Wu ...................... G06F 3/0443
2021/0066624 A1    3/2021   Wang

FOREIGN PATENT DOCUMENTS

| | | |
|---|---|---|
| CN | 109545087 A | 3/2019 |
| CN | 109817097 A | 5/2019 |
| CN | 110444549 A | 11/2019 |
| CN | 110570762 A | 12/2019 |
| CN | 111145640 A | 5/2020 |
| CN | 112542090 A | 3/2021 |
| CN | 112864180 A | 5/2021 |
| WO | 2021118538 A1 | 6/2021 |

\* cited by examiner

| providing a flexible substrate, wherein the flexible substrate has a first region and second regions, the flexible substrate has at least two of the second regions, the first region is defined between adjacent two of the second regions, and the foldable display panel is folded in the first region | ~ 11 |

| manufacturing at least two display screens on the flexible substrate, wherein the display screens are disposed in the second regions | ~ 12 |

| manufacturing photo spacers on the flexible substrate, wherein the photo spacers are disposed in the first region, and the widths of the photo spacers gradually decrease from the flexible substrate to the direction away from the flexible substrate | ~ 13 |

FIG. 8

FOLDABLE DISPLAY PANEL AND MANUFACTURING METHOD OF FOLDABLE DISPLAY PANEL

BACKGROUND OF INVENTION

Field of Invention

The present application relates to a field of display technology, and particularly to a foldable display panel and a manufacturing method of the foldable display panel.

Description of Prior Art

In recent years, flexible technology has attracted more and more attention, and requirements for flexibility of flexible substrates are increasingly higher. The flexible display panels are display panels produced by disposing a plurality of pixels on flexible substrates such as plastic films, which are easy to be bent. In recent years, foldable display devices using the flexible display panels have been researched and developed. In procedures of research and practice of the prior art, the inventor of the present application found that stress of the foldable display panel is difficult to be dispersed during folding, which is difficult to meet foldability requirements of the foldable display panels.

SUMMARY OF INVENTION

Embodiments of the present application provide a foldable display panel and a manufacturing method of the foldable display panel, which can improve the foldability of the foldable display panels.

One embodiment of the present application provides a foldable display panel, including:
- a flexible substrate, wherein the flexible substrate has a first region and second regions, the flexible substrate has at least two of the second regions, the first region is defined between adjacent two of the second regions, and the first region is a folded region;
- display screens, wherein the display screens are disposed in the second regions;
- a plurality of photo spacers, wherein the photo spacers are disposed in the first region, and widths of the photo spacers gradually decrease from the flexible substrate to a direction away from the flexible substrate.

Optionally, in some embodiments of the present application, a material of the photo spacers is an organic photoresist material.

Optionally, in some embodiments of the present application, a bumpy surface is formed on a side of the plurality of photo spacers away from the flexible substrate; and when the foldable display panel is folded, the bumpy surface is folded to form a stress space.

Optionally, in some embodiments of the present application, heights of the plurality of photo spacers are not equal; and when the foldable display panel is folded, the stress space is formed between the photo spacers.

Optionally, in some embodiments of the present application, the photo spacers include first photo spacers and second photo spacers, the first photo spacers have a first height, the second photo spacers have a second height, the first height and the second height are not equal, and the first photo spacers and the second photo spacers are disposed alternately.

Optionally, in some embodiments of the present application, a first bumpy structure is disposed on a lateral wall of the first photo spacers, and a second bumpy structure is disposed on a lateral wall of the second photo spacers, and wherein when the foldable display panel is folded, the first bumpy structure engages with the second bumpy structure.

Optionally, in some embodiments of the present application, the photo spacers include a plurality of photo spacer groups, one of the photo spacer groups includes at least three photo spacers with different heights.

Optionally, in some embodiments of the present application, the heights of the photo spacers gradually increase along a direction of a center of the first region close toward the display screens.

Optionally, in some embodiments of the present application, heights of the plurality of photo spacers are same; and when the foldable display panel is folded, the stress space is formed between the photo spacers.

Optionally, in some embodiments of the present application, the display screens include a passivation layer, a planarization layer, and a pixel definition layer disposed in a stack sequentially, and the photo spacers include at least one layer of the passivation layer, the planarization layer, or the pixel definition layer.

Optionally, in some embodiments of the present application, widths of a side of the plurality of photo spacers away from the flexible substrate are same or different, and widths of a side of the plurality of photo spacers close to the flexible substrate are same or different.

Optionally, in some embodiments of the present application, the widths of the side of the photo spacers close to the flexible substrate range from 3 μm to 12 μm.

Optionally, in some embodiments of the present application, the widths of the photo spacers gradually increase along a direction of a center of the first region close toward the display screens.

Optionally, in some embodiments of the present application, a width of the first region ranges from 3 μm to 6 μm, and a height of the display screens does not exceed 6 μm.

Optionally, in some embodiments of the present application, heights of the photo spacers are not less than a half of a height of the display screens and do not exceed twice of the height of the display screens.

Optionally, in some embodiments of the present application, heights of the photo spacers are less than a height of the display screens.

Optionally, in some embodiments of the present application, an elastic layer is disposed on the flexible substrate, and the photo spacers are disposed on the elastic layer.

Correspondingly, the present application further provides a foldable display panel, including:
- a flexible substrate, wherein the flexible substrate has a first region and second regions, the flexible substrate has at least two of the second regions, the first region is defined between adjacent two of the second regions, and the first region is a folded region;
- display screens, wherein the display screens are disposed in the second regions;
- a plurality of photo spacers, wherein the photo spacers are disposed in the first region, widths of the photo spacers gradually decrease from the flexible substrate to a direction away from the flexible substrate, a material of the photo spacers is an organic photoresist material, and wherein a bumpy surface is formed on a side of the plurality of photo spacers away from the flexible substrate; and when the foldable display panel is folded, the bumpy surface is folded to form a stress space.

Correspondingly, the present application further provides a manufacturing method of the foldable display panel, including:

provid a flexible substrate, wherein the flexible substrate has a first region and second regions, the flexible substrate has at least two of the second regions, the first region is defined between adjacent two of the second regions, and the foldable display panel is folded in the first region;

manufacturing at least two display screens on the flexible substrate, wherein the display screens are disposed in the second regions;

manufacturing photo spacers on the flexible substrate, wherein the photo spacers are disposed in the first region, and widths of the photo spacers gradually decrease from the flexible substrate to a direction away from the flexible substrate.

Optionally, in some embodiments of the present application, a material of the photo spacers is an organic photoresist material, and manufacturing the photo spacers on the flexible substrate includes:

manufacturing the flexible substrate in the first region by a photo manner.

The embodiments of the present application provide the foldable display panel and the manufacturing method of the display panel. The plurality of photo spacers are disposed in the first region of the foldable display panel, i.e., the plurality of photo spacers are disposed at a folded position. The widths of the photo spacers gradually decrease from the flexible substrate to the direction away from the flexible substrate. When the foldable display panel is folded, the photo spacers can cooperate with a folding curve to contact with each other, thereby reducing extrusion between the plurality of photo spacers. Furthermore, as the widths of the photo spacers gradually decrease from the flexible substrate to the direction away from the flexible substrate, on one aspect, folding stress between the photo spacers in a folded state can be weakened, and on another aspect, a certain frictional force can be generated on contact surfaces between the plurality of photo spacers in the folded state, making more stable support. Therefore, foldability of the first region of the foldable display panel when folded can be improved.

DESCRIPTION OF DRAWINGS

To more clearly illustrate embodiments or the technical solutions of the present application, the accompanying figures of the present application required for illustrating embodiments or the technical solutions of the present application will be described in brief. Obviously, the accompanying figures described below are only part of the embodiments of the present application, from which figures those skilled in the art can derive further figures without making any inventive efforts.

FIG. 8 is a flowchart of a manufacturing method of the foldable display panel provided by one embodiment of the present application.

DETAILED DESCRIPTION OF EMBODIMENTS

Figure 1:
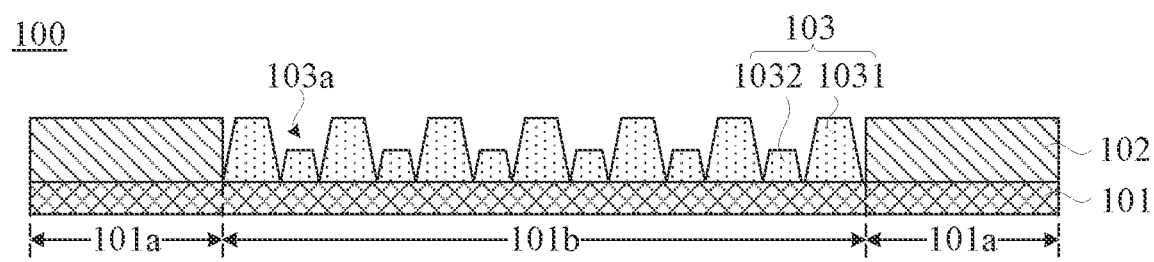
FIG. 1 is a first structural schematic diagram of a foldable display panel provided by one embodiment of the present application.

The technical solutions in the embodiments of the present application are clearly and completely described in the following with reference to the accompanying drawings in the embodiments of the present application. Obviously, the described embodiments are only part of the embodiments of the present application, but are not all embodiments of the present application. All other embodiments obtained by those skilled in the art based on the embodiments of the present application without creative efforts are within the scope of the present application. Besides, it should be understood that the specific embodiments described herein are merely for describing and explaining the present application and are not intended to limit the present application. In the present application, unless opposite stated, the orientation words used such as "upper" and "lower" generally refer to the upper and lower directions of the device in actual using or working state, and specifically refer to the drawing directions in the drawings, and "inner" and "outer" refer to the outline of the device.

Embodiments of the present application provide a foldable display panel and a manufacturing method of the display panel. The details are described below respectively. It should be noted that a description order of the following embodiments is not intended to limit a preferred order of the embodiments.

Figure 2:
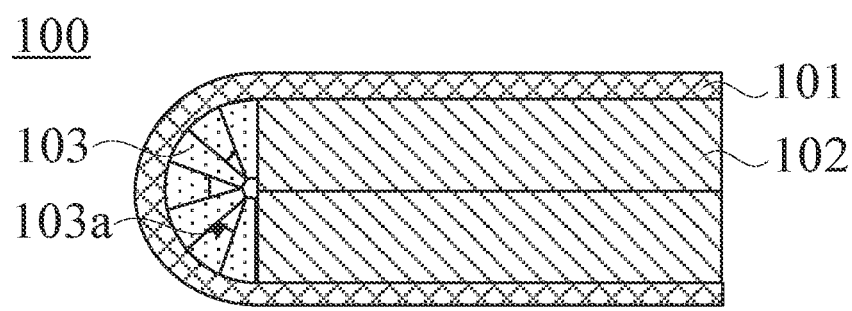
FIG. 2 is a folded state of the foldable display panel provided by one embodiment of the present application.

Please refer to FIG. 1 to FIG. 2. FIG. 1 is a first structural schematic diagram of a foldable display panel provided by one embodiment of the present application. FIG. 2 is a folded state of the foldable display panel provided by one embodiment of the present application. The foldable display panel 100 provided by the embodiments of the present application includes a flexible substrate 101, display screens 102, and photo spacers 103. The flexible substrate has a first region 101b and second regions 101a. Wherein, the flexible substrate 101 has at least two second regions 101a. The first region 101b is defined between adjacent two of the second regions 101a. The first region 101b is a folded region. The second regions 101a are display regions, and the second regions 101a are non-folded regions. The display screens 102 are disposed in the second regions 101a. The photo spacers 103 are disposed in the first region 101b. Widths of the photo spacers 103 gradually decrease from the flexible substrate 101 to a direction away from the flexible substrate 101.

The plurality of photo spacers 103 are disposed in the first region of the foldable display panel 100 provided by one embodiment of the present application, i.e., the plurality of photo spacers 103 are disposed at a folded position. The widths of the photo spacers 103 gradually decrease from the flexible substrate 101 to a direction away from the flexible substrate 101. When the foldable display panel 100 is folded, the photo spacers 103 can cooperate with a folding curve to contact with each other, thereby reducing extrusion between the plurality of photo spacers 103. Furthermore, as the widths of the photo spacers 103 gradually decrease from the flexible substrate 101 to the direction away from the flexible substrate, on one aspect, folding stress between the photo spacers 103 in a folded state can be weakened, and on another aspect, a certain frictional force can be generated on contact surfaces between the plurality of photo spacers 103 in the folded state, making more stable support. Therefore, foldability of the first region 101b of the foldable display panel 100 when the foldable display panel 100 is folded can be improved.

Wherein, a material of the photo spacers 103 is an organic photoresist material. The photo spacers 103 made of one organic photoresist material is disposed in the foldable display panel 100. This kind of the photo spacers 103 can serve a good supporting effect on a folded part of the foldable display panel 100 during folding. In addition, compared to inorganic materials, organic materials have better foldability. The photo spacers 103 are disposed in the first region 101b, which can not only support the folding of the foldable display panel 100, but can also ensure folding in the first region 101b to not be affected. Furthermore, the organic materials have good stress dispersion effect. By adopting the organic material to manufacture the photo spacers 103, bending stress in the first region 101b can be dispersed better.

Wherein, organic photoresist materials can be mainly divided into positive photoresists and negative photoresists, which can also be named as positive photolithography adhesive and negative photolithography adhesive. The positive photoresist is that a part irradiated by light can be removed by a developer, while unexposed photoresist is not removed by the developer. In this way, as the positive photoresist itself is difficult to be dissolved in the developer and dissociates into small molecules after exposure to form a structure, a structure easily dissolved in the developer is formed. However, negative photoresist is opposite. After exposure, a structure of the negative photoresist being not easily dissolved in the developer is formed, a part of the negative photoresist irradiated by the light is not removed by the developer, and a rest region not irradiated by the light is removed by the developer.

Wherein, a material of the positive resist can be diazonaphthoquinone compounds or o-diazoquinone compounds. The negative photoresist can be polycinnamate compounds or polyhydrocarbon-bisazide compounds.

Wherein, heights of the photo spacers 103 are less than a height of the display screens 102, which allows folding of the foldable display panel 100 is not blocked. Furthermore, under the support of the photo spacers 103, deformation at the folded position of the foldable display panel 100 can be prevented.

Optionally, please continue referring to FIG. 1. A bumpy surface is formed on a side of the plurality of photo spacers 103 away from the flexible substrate 101. When the foldable display panel 100 is folded, the bumpy surface is folded to form a stress space 103a. After the bumpy surface is formed, in the folded state of the foldable display panel 100, the side of the photo spacers 103 away from the flexible substrate 101 do not squeeze to each other, but certain gaps are retained, which can serve an effect of relieving the stress.

Optionally, widths of a side of the plurality of photo spacers 103 away from the flexible substrate 101 are same or different, and widths of a side of the plurality of photo spacers 103 close to the flexible substrate 101 are same or different. In the embodiment illustrated in FIG. 1, the widths of the side of the plurality of photo spacers 103 away from the flexible substrate 101 being different, and the widths of the side of the plurality of photo spacers 103 close to the flexible substrate 101 being different are taken as an example for description, but do not act as only limitation of the embodiments of the present application. The widths of the plurality of photo spacers 103 can be designed adaptively according to folding intensity and folding stress.

For example, if folding stress and folding intensity in the first region 101 close to the display screens 102 are relatively small, the photo spacers 103 with wider widths and higher heights can be designed at this position to achieve better support effect. If folding stress and folding intensity in the first region 101 close to the display screens 102 are relatively large, the photo spacers 103 with narrower widths and lower heights can be designed at this position to achieve better support effect, i.e., the widths of the photo spacers 103 gradually increase along a direction of a center of the first region 101b close toward the display screens 102. The heights of the photo spacers 103 gradually increase along a direction of a center of the first region 101b close toward the display screens 102.

It can be understood that when the widths of the photo spacers 103 are different, there can also be other design methods, examples are not described herein again.

Optionally, the widths of the photo spacers 103 range from 3 μm to 12 μm. Specifically, the widths of the photo spacers 103 can be 3 μm, 4 μm, 5 μm, 6 μm, 7 μm, 8 μm, 9 μm, 10 μm, 11 μm, or 12 μm. The specific widths of the photo spacers 130 can be designed adaptively according to a size of the foldable display panel 100. When the foldable display panel 100 is a large-size panel, width of the first region 101b is larger. In order to facilitate manufacturing processes, photo spacers 103 with a larger width can be appropriately selected for support. It can be understood that in the large-size foldable display panel 100, the photo spacers 103 with smaller widths can also be disposed to adapt to different folding conditions of the foldable display panel 100.

Optionally, please continue referring to FIG. 1. The heights of the plurality of photo spacers 103 are not equal. When the foldable display panel 100 is folded, the stress space 103a is formed between the photo spacers 103. By designing the heights of the plurality of photo spacers 103 to be different, the side of the photo spacers 103 away from the flexible substrate 101 form the bumpy surface. In the folded state of the foldable display panel 100, the photo spacers 103 with different heights do not squeeze to each other, but certain gaps are retained, which can serve an effect of relieving the stress.

Figure 3:
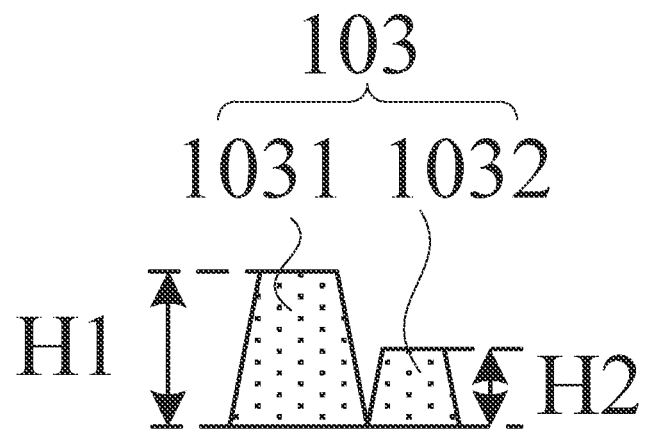
FIG. 3 is a first partial schematic diagram of the foldable display panel provided by one embodiment of the present application.

Optionally, as illustrated in FIG. 1, the photo spacers 103 include first photo spacers 1031 and second photo spacers 1032, Specifically, please combine with FIG. 3. FIG. 3 is a first partial schematic diagram of the foldable display panel provided by one embodiment of the present application. The first photo spacers 1031 have a first height H1. The second photo spacers 1032 have a second height H2. The first height H1 and the second height H2 are not equal, and the first photo spacers 1031 and the second photo spacers 1032 are disposed alternately. When the photo spacers 103 with different heights are alternately disposed, distance between the first photo spacers 1031 in the folded state is increased, which can prevent all the photo spacers 103 from being squeezed at a folding center of the foldable display panel 100, thereby releasing the stress.

Figure 4:
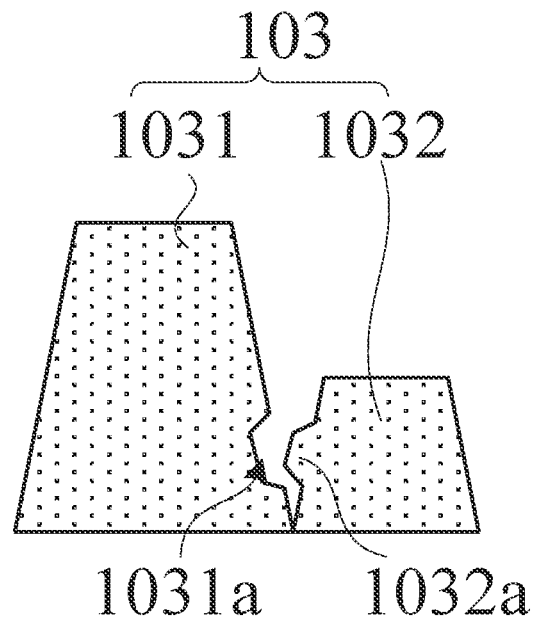
FIG. 4 is a second partial schematic diagram of the foldable display panel provided by one embodiment of the present application.

Optionally, please refer to FIG. 4. FIG. 4 is a second partial schematic diagram of the foldable display panel provided by one embodiment of the present application. Bumpy structures can further be disposed on lateral walls of the first photo spacers 1031 and the second photo spacers 1032. Specifically, a first bumpy structure 1031a is disposed on the lateral wall of the first photo spacers 1031, and a second bumpy structure 1032a is disposed on the lateral wall of the second photo spacers 1032. Wherein, when the foldable display panel 100 is folded, the first bumpy structure 1031a engages with the second bumpy structure 1032a.

Specifically, the first bumpy structure 1031a and the second bumpy structure 1032a can be formed by an etching method to control a concentration and usage. When the foldable display panel 100 is folded, the first bumpy structure 1031a engages with the second bumpy structure 1032a, which can allow better engagement between the photo spacers 103 to enhance the support effect.

It can be understood that the bumpy structure of the lateral wall of the photo spacers 103 can be disposed between the photo spacers 103 with a same height. On one hand, force generated from the extrusion between the photo spacers 103 can be released better, and on the other hand, engagement of the photo spacers 103 during folding can be made to be better.

Figure 5:
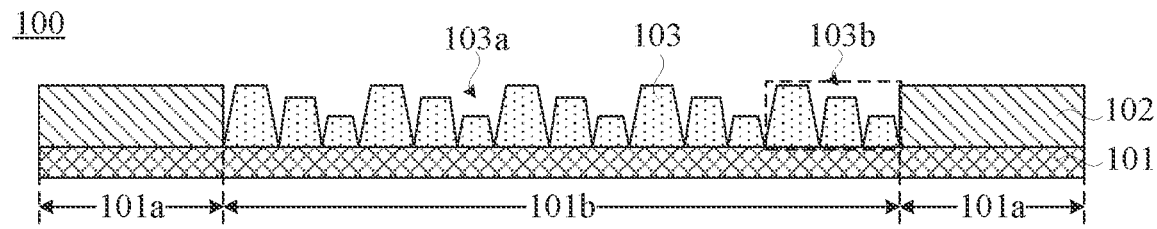
FIG. 5 is a second structural schematic diagram of the foldable display panel provided by one embodiment of the present application.

Optionally, please refer to FIG. 5. FIG. 5 is a second structural schematic diagram of the foldable display panel provided by one embodiment of the present application. In some embodiments of the present application, the photo spacers 103 include a plurality of photo spacer groups 103b. One of the photo spacer groups 103b include photo spacers 103 with at least three different heights. A step in the photo spacer groups 103b of the photo spacer 103, i.e., the photo spacers 103 can also include the photo spacers 103 with more than three different heights, and they are arranged in sequence at the three heights.

As an arrangement method of the photo spacers 103 illustrated in FIG. 5, the stress generated by the folded display panel 100 in the folded state can be transmitted along the steps, thereby dispersing the stress better.

Optionally, in some embodiments of the present application, the heights of the plurality of photo spacers 103 are equal. When the foldable display panel 100 is folded, the stress space 103a is formed between the photo spacers 103. Similarly, the widths of the photo spacers 103 can be made to decrease gradually from the flexible substrate 101 to the direction away from the flexible substrate 101 to form a bumpy surface on a surface of the photo spacers 103 away from the flexible substrate 101. The widths of the photo spacers 103 gradually decrease from the flexible substrate 101 to the direction away from the flexible substrate, so the photo spacers 103 can not squeeze each other, when the foldable display panel 100 is folded. The heights of the photo spacers 103 can be configured to be equal, which can make manufacturing processes to be simple. Furthermore, after the foldable display panel 100 is folded, an approximately arc-shaped surface is also formed on the side of the photo spacers 103 away from the flexible substrate 101, which makes the folding stress to be dispersed more easily.

Optionally, in some embodiments of the present application, a width of the first region 101b ranges from 3 μm to 6 μm, and a height of the display screens 102 does not exceed 6 μm. Specifically, the width of the first region 101b can be 3 μm, 3.5 μm, 4 μm, 4.5 μm, 5 μm, 5.5 μm, or 6 μm. The width of the display screens 102 can be 3 μm, 3.5 μm, 4 μm, 4.5 μm, 5 μm, 5.5 μm, or 6 μm. Wherein, the width of the first region 101b is not as narrow as possible. If the first region 101b is too narrow, when the foldable display panel is folded, the folding stress at the first region 101b can be increased. However, if the first region 101b is too wide, when the foldable display panel is in a flat state, the display effect may be affected. Therefore, the first region 101b is configured to range from 3 μm to 6 μm. The height of the display screens 102 is obtained according to thicknesses of each film layer in the display screens 102, and detailed description is not mentioned herein.

Optionally, the heights of the photo spacers 103 are not less than a half of the height of the display screens 102 and do not exceed twice of the height of the display screens 102. For example, when the height of the display screens 102 is 6 μm, the heights of the photo spacers 103 can range from 3 μm to 12 μm. This design is because if the heights of the photo spacers 103 are lower than a half of the height of the display screens 102, the folded position cannot be able to have good support effect. However, if the heights of the photo spacers 103 are higher than twice of the height of the display screens 102, when the foldable display panel 100 is folded, the photo spacers 103 can against with the display screens 102, which affects folding of the foldable display panel 100.

Figure 6:
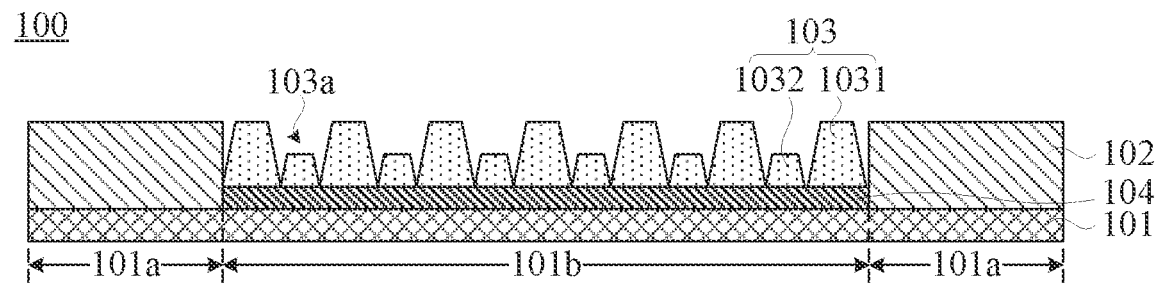
FIG. 6 is a third structural schematic diagram of the foldable display panel provided by one embodiment of the present application.

Optionally, please refer to FIG. 6. FIG. 6 is a third structural schematic diagram of the foldable display panel provided by one embodiment of the present application. In some embodiments of the present application, an elastic layer 104 is further disposed on the flexible substrate 101, and the photo spacers 103 are disposed on the elastic layer 104. Disposing the elastic layer 104 can further buffer the folding stress at the folded position of the foldable display panel 100. When the photo spacers 103 are squeezed, the elastic layer 104 can be deformed appropriately to release the stress, weakening squeezing force between the photo spacers 103.

Figure 7:
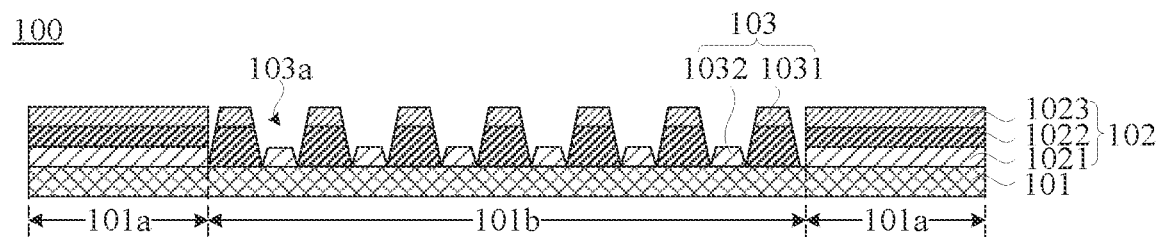
FIG. 7 is a fourth structural schematic diagram of the foldable display panel provided by one embodiment of the present application.

Optionally, please refer to FIG. 7. FIG. 7 is a fourth structural schematic diagram of the foldable display panel provided by one embodiment of the present application. The display screens 102 include a passivation layer 1021, a planarization layer 1022, and a pixel definition layer 1023 disposed in a stack sequentially. The photo spacers 103 include at least one layer of the passivation layer 1021, the planarization layer 1022, or the pixel definition layer 1023.

It can be understood that the other devices are included in the display screens. Other devices and assembly thereof are technical means well known to those skilled in the art, and redundant description is not mentioned herein again.

The photo spacers 103 including at least one layer of the passivation layer 1021, the planarization layer 1022, or the pixel definition layer 1023 refers that the photo spacers 103 can be manufactured simultaneously while the passivation layer 1021, the planarization layer 1022, or the pixel definition layer 1023 are manufactured. As there are a plurality of organic film layers in the display screens 102, bendability of the organic film layers is better, the release effect of the folding stress is better. Therefore, manufacturing the photo spacers 103 simultaneously while manufacturing the display screens 102 can be considered. Therefore, one or more layers of the passivation layer 1021, the planarization layer 1022, or the pixel definition layer 1023 in the display panels 102 can be used to manufacture the photo spacers 103 simultaneously.

Optionally, the photo spacers 103 can have different heights. When supporting columns 103 of different heights are manufactured, different film layers can be used for the manufacture. For example, if the height of the photo spacers 103 is relatively low, the photo spacers 103 with the first height are manufactured simultaneously, while the passivation layer 1021 is manufactured. If the height of the photo spacers 103 is relatively high, the photo spacers 103 are manufactured in the first region 101b simultaneously, while the passivation layer 1021 and the planarization layer 1022 are manufactured, i.e., the photo spacers 103 can be a single-layer structure or a multi-layer structure.

The photo spacers 103, and the passivation layer 121, the planarization layer 1022, and the pixel definition layer 1023 can be disposed on one same layer or a plurality of same layers, which can simplify steps of the manufacturing processes and can speed up progress of the manufacturing processes to make manufacturing of the photo spacers 103 be more convenient Correspondingly, one embodiment of the present application further provides a manufacturing method of the foldable display panel. Please refer to FIG. 8. FIG. 8 is a flowchart of a manufacturing method of the foldable display panel provided by one embodiment of the present application. The manufacturing method of the foldable display panel provided by the embodiment of the present application specifically includes following steps.

Steps 11: providing a flexible substrate, wherein the flexible substrate has a first region and second regions, the flexible substrate has at least two of the second regions, the first region is defined between adjacent two of the second regions, and the foldable display panel is folded in the first region.

Specifically, a material of the flexible substrate can be polyimide (PI), polyethylene (PE), polypropylene (PP), polystyrene (PS), polyethylene glycol terephthalate (PET), or polyethylene naphthalate two formic acid glycol ester (PEN) The polymer materials have good flexibility, light weight and impact resistance, which are suitable for flexible display panels. Wherein, polyimide can further realize good heat resistance and stability.

Step 12: manufacturing at least two display screens on the flexible substrate, wherein the display screens are disposed in the second regions.

Specifically, methods such as deposition, evaporation, sputtering, coating, and inkjet printing are adopted to manufacture various film layers of the display screens on the flexible substrate.

Step 13: manufacturing photo spacers on the flexible substrate, wherein the photo spacers are disposed in the first region, and the widths of the photo spacers gradually decrease from the flexible substrate to the direction away from the flexible substrate.

Optionally, a material of the photo spacers is an organic photoresist material. A photo manner can be adopted to manufacture the flexible substrate in the first region.

In the manufacturing processes of the display screens, many film layers need to be performed by patterning processes, for example, a first metal layer, a second metal layer, a pixel electrode layer, or a pixel definition layer, etc. When the patterning processes are performed on these film layers, the organic photoresist material needs to be coated on top of the film layers, i.e, the organic photoresist material of the photo spacers in the embodiments of the present application is formed. Therefore, the organic photoresist material can be coated in the first region simultaneously while the display screens are manufactured. Manufacturing processes of the coating method are controllable. After coating, not only storage of the photo spacers is conducive, but also corruption of the photo spacers in the subsequent process can be prevented. Meanwhile, production costs are also reduced, and production efficiency is improved.

Optionally, during patterning, after the organic photoresist material is coated, photolithography or etching needs to be performed on the photoresist material to form a patterned photoresist layer. Then photolithography or etching is performed on the film layer to obtain a patterned film structure. When the patterning is performed on the photoresist layer, photolithography or etching can also be performed on the organic photoresist material coated in the first region to form the photo spacers having the bumpy surface in the embodiments of the present application. Optionally, the photo spacers can also be manufactured after the display screens have been manufactured, which is not limited by the embodiments of the present application.

Because the material of the photo spacers is the organic photoresist material, the photo method is directly adopted to manufacture the photo spacers in the first region of the display screens, which can save process cost.

By adopting the photo method in the manufacturing method of the foldable display panel provided by the embodiments of the present application to manufacture the photo spacers in the first region, the processes can be simplified. Because the photo process is a common process for manufacturing a display panel, it has advantages of low cost and high accuracy.

The foldable display panel and the manufacturing method of the foldable display panel provided by the embodiments of the present application are described in detail. This article uses specific cases for describing the principles and the embodiments of the present application, and the description of the embodiments mentioned above is only for helping to understand the method and the core idea of the present application. Meanwhile, for those skilled in the art, will have various changes in specific embodiments and application scopes according to the idea of the present application. In summary, the content of the specification should not be understood as limit to the present application.

What is claimed is:

1. A foldable display panel, comprising:
a flexible substrate, wherein the flexible substrate has a first region and second regions, the flexible substrate has at least two of the second regions, the first region is defined between adjacent two of the second regions, and the first region is a folded region;
display screens, wherein the display screens are disposed in the second regions;
a plurality of photo spacers, wherein the photo spacers are disposed in the first region, and widths of the photo spacers gradually decrease from the flexible substrate to a direction away from the flexible substrate;
wherein the display screens comprise a passivation layer, a planarization layer, and a pixel definition layer disposed in a stack sequentially, and
wherein the photo spacers comprise at least one layer of the passivation layer, the planarization layer, or the pixel definition layer.

2. The foldable display panel as claimed in claim 1, wherein a material of the photo spacers is an organic photoresist material.

3. The foldable display panel as claimed in claim 1, wherein a bumpy surface is formed on a side of the plurality of photo spacers away from the flexible substrate; and when the foldable display panel is folded, the bumpy surface is folded to form a stress space.

4. The foldable display panel as claimed in claim 3, wherein heights of the plurality of photo spacers are not equal; and when the foldable display panel is folded, the stress space is formed between the photo spacers.

5. The foldable display panel as claimed in claim 4, wherein the photo spacers comprise first photo spacers and second photo spacers, the first photo spacers have a first height, the second photo spacers have a second height, the first height and the second height are not equal, and the first photo spacers and the second photo spacers are disposed alternately.

6. The foldable display panel as claimed in claim 1, wherein a first bumpy structure is disposed on a lateral wall of the first photo spacers, and a second bumpy structure is disposed on a lateral wall of the second photo spacers, and wherein when the foldable display panel is folded, the first bumpy structure engages with the second bumpy structure.

7. The foldable display panel as claimed in claim 4, wherein the photo spacers comprise a plurality of photo spacer groups, one of the photo spacer groups comprises at least three photo spacers with different heights.

8. The foldable display panel as claimed in claim 3, wherein heights of the plurality of photo spacers are same; and when the foldable display panel is folded, the stress space is formed between the photo spacers.

9. The foldable display panel as claimed in claim 1, wherein widths of a side of the plurality of photo spacers away from the flexible substrate are same or different, and widths of a side of the plurality of photo spacers close to the flexible substrate are same or different.

10. The foldable display panel as claimed in claim 9, wherein the widths of the side of the photo spacers close to the flexible substrate range from 3 μm to 12 μm.

11. The foldable display panel as claimed in claim 9, wherein the widths of the photo spacers gradually increase along a direction of a center of the first region close toward the display screens.

12. The foldable display panel as claimed in claim 1, wherein a width of the first region ranges from 3 μm to 6 μm, and a height of the display screens does not exceed 6 μm.

13. The foldable display panel as claimed in claim 1, wherein heights of the photo spacers are not less than a half of a height of the display screens and do not exceed twice of the height of the display screens.

14. The foldable display panel as claimed in claim 1, wherein heights of the photo spacers are less than a height of the display screens.

15. The foldable display panel as claimed in claim 1, wherein an elastic layer is disposed on the flexible substrate, and the photo spacers are disposed on the elastic layer.

16. A foldable display panel, comprising:
a flexible substrate, wherein the flexible substrate has a first region and second regions, the flexible substrate has at least two of the second regions, the first region is defined between adjacent two of the second regions, and the first region is a folded region;
display screens, wherein the display screens are disposed in the second regions;
a plurality of photo spacers, wherein the photo spacers are disposed in the first region, widths of the photo spacers gradually decrease from the flexible substrate to a direction away from the flexible substrate, and a material of the photo spacers is an organic photoresist material, and
wherein a bumpy surface is formed on a side of the plurality of photo spacers away from the flexible substrate; and when the foldable display panel is folded, the bumpy surface is folded to form a stress space;
wherein the display screens comprise a passivation layer, a planarization layer, and a pixel definition layer disposed in a stack sequentially, and
wherein the photo spacers comprise at least one layer of the passivation layer, the planarization layer, or the pixel definition layer.

17. A manufacturing method of a foldable display panel, comprising:
providing a flexible substrate, wherein the flexible substrate has a first region and second regions, the flexible substrate has at least two of the second regions, the first region is defined between adjacent two of the second regions, the foldable display panel is folded in the first region;
manufacturing at least two display screens on the flexible substrate, wherein the display screens are disposed in the second regions, and the display screens comprise a passivation layer, a planarization layer, and a pixel definition layer disposed in a stack sequentially;
manufacturing photo spacers on the flexible substrate, wherein the photo spacers are disposed in the first region, the photo spacers comprise at least one layer of the passivation layer, the planarization layer, or the pixel definition layer, and widths of the photo spacers gradually decrease from the flexible substrate to a direction away from the flexible substrate.

18. The manufacturing method of the foldable display panel as claimed in claim 17, wherein a material of the photo spacers is an organic photoresist material, and manufacturing the photo spacers on the flexible substrate comprises:
manufacturing the flexible substrate in the first region by a photo manner.

* * * * *